United States Patent

[11] 3,578,150

[72] Inventors: Camillo Pirovano
Via Monza, 51, Cernusco Lombardone, (Como);
Costante Radaelli, Via Ardigo, 38, Monza, (Milan), Italy
[21] Appl. No.: 723,199
[22] Filed: Apr. 22, 1968
[45] Patented: May 11, 1971
[32] Priority: Apr. 22, 1967, Apr. 9, 1968
[33] Italy
[31] 15289A/67 and 15001A/68

[54] CONVEYING MEMBER FOR INCOHERENT OR POWDERY MATERIALS, ESPECIALLY FOOD FOR POULTRY OR LIKE ANIMALS, AND DEVICE FOR THE MANUFACTURE THEREOF
6 Claims, 6 Drawing Figs.

[52] U.S. Cl. .................................................. 198/213
[51] Int. Cl. .................................................. B65g 33/00
[50] Field of Search .................................. 198/213, 214, 215, 216, 217; 103/72, 73, 74

[56] References Cited
UNITED STATES PATENTS

| 3,512,223 | 5/1970 | Willinger | 294/74X |
| 988,301 | 4/1911 | Bessonnet-Favre | 103/72 |
| 2,045,757 | 6/1936 | Constantin | 198/213 |
| 2,911,802 | 11/1959 | Holland | 198/213(UX) |
| 3,280,963 | 10/1966 | Kirker | 198/213 |

FOREIGN PATENTS

| 1,458,145 | 10/1966 | France | 198/213 |

Primary Examiner—Evon C. Blunk
Assistant Examiner—Douglas D. Watts
Attorney—Stevens, Davis, Miller and Mosher ABSTRACT: A conveying member for dispensing food to poultry and like animals is disclosed, which comprises a flexible core made by a steel rope and a helical sheath applied to the exterior of said rope by concurrent extrusion of a thermoplastic material. The helical sheath may comprise a single helix or a plural helix, the helical web being possibly interrupted by notches in order to improve the flexibility. The conveying member is used by placing it, in closed loop, within a tubular casing which is properly perforated at the dispensing points to feed the underlying troughs.

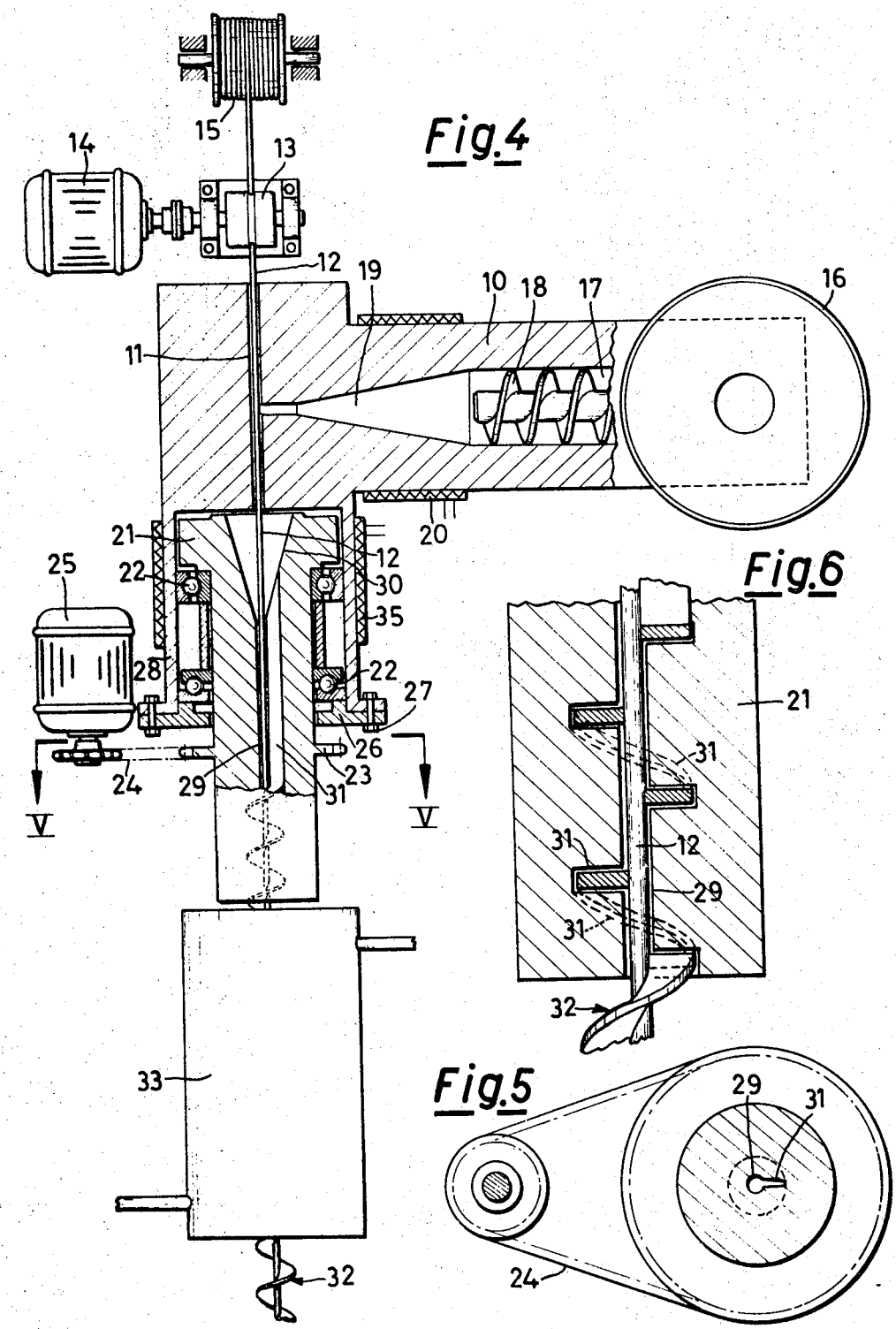

3,578,150

CONVEYING MEMBER FOR INCOHERENT OR POWDERY MATERIALS, ESPECIALLY FOOD FOR POULTRY OR LIKE ANIMALS, AND DEVICE FOR THE MANUFACTURE THEREOF

This invention relates to a conveying member for nonadherent or powdery materials, and more particularly for food for domestic fowl, for example, chickens.

The subject conveying member, in the case of the conveyance of food for chickens and the like, comprises an elongate body having the shape of a closed loop, having a certain pliability, which is actuated by appropriate means (which are in themselves not a part of this invention) so as to be displaced along a predetermined path for conveying the food which is dispensed to the troughs placed alongside said path.

Conveying means with paddles or scrapers are known, which, for example, are essentially formed by a set of paddles affixed, at regular intervals, to a continuous chain. These conveying means are impaired by certain drawbacks which are mainly due to the production of noise, the difficulty of lubrication and the proneness to chain jamming.

The conveying member according to this invention is particularly advantageous as compared with said prior art paddle conveyors and other conveyors and is essentially characterized in that it comprises a rope of a material having a certain resistance and pliability, and a body, also having resistance and flexibility properties, shaped as a single or multiple helix integral with said rope and coaxial therewith.

The principal advantage afforded by the inventive device is a product having excellent mechanical properties for its intended use.

Other features and advantages will become clearly apparent from the ensuing disclosure of a preferred embodiment of the conveying member being given herein by way of example only without any implied limitation, reference being had to the accompanying drawings, wherein:

FIG. 4 is a partial diagrammatical cross-sectional view of the device according to this invention.

FIG. 5 is a cross-sectional view taken along the line II–II of FIG. 4, and

FIG. 6 is a detail sectional view of the end portion of the extruder.

Figure 1:
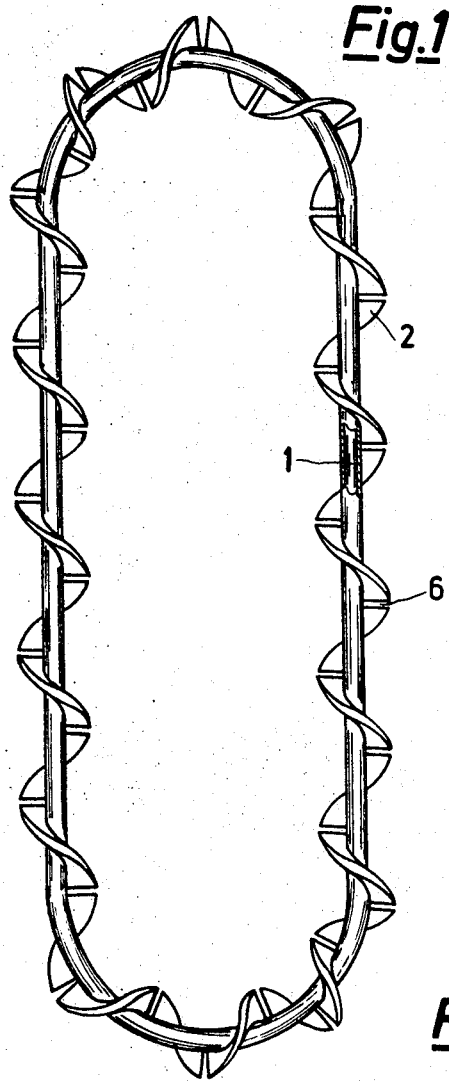
FIG. 1 is a plan view of the conveying member.

The member shown in FIG. 1 comprises a core, indicated as a steel rope 1, which is flexible, and a plastic material body 2 (e.g. polyamide resin) which also is resistant and flexible and has a integrally formed helical web. The body 2 is coaxial with the rope 1 and is molded integrally therewith, the helical web being provided with notches 6 intended to improve the flexibility of the assembly.

The subject member, formed by said component parts 1 and 2 aforementioned, constitutes a closed loop in one employment. Said member is then actuated so as to be moved along a closed loop path having, for example, the shape shown in the drawing and which is possibly supplemented by a second helix according to a direction opposite to that of the first helix and crossing the latter. Said movement is practicable since, as outlined above, the member is a flexible one.

In addition, the member is actuated so as to be displaced without rotating.

The actuating means for said member (for example an assembly of the kind of worm and wheel) are as themselves foreign to the present invention.

Along such a path, troughs for poultry or other animals are sequentially arranged.

Figure 2:
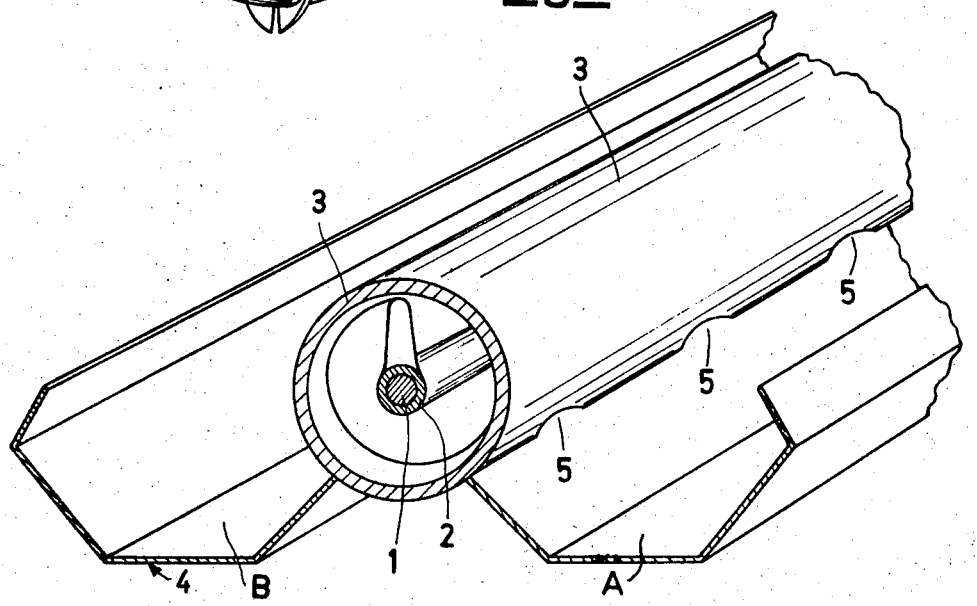
FIG. 2 is a perspective view of a portion of a trough to which food is forwarded by said member.

By way of example, each trough is of the kind shown in FIG. 2. In the example shown, the conveying member slides within a tubular body 3, positioned above the trough and shown at 4. The food, conveyed along the tube 3 by the helical member 2 which draws said food, emerges from the tube 3 through holes 5 and is dropped into the trough. Holes 5 are provided both for the trough portion A and for the trough portion B and thus the food, conveyed along the tube 3 of the subject conveying member, is dispensed to the portion A and B and then eaten by the fowl.

As outlined above it is the helix 2 itself which, by being displaced without being rotated, draws the food.

The food conveyance takes place quite regularly and clogging is forestalled. More particularly, said helix 2 imparts a thrust to the material, i.e. food, which is uniformly dispensed. The result is an extremely regular dispensing of the food to the troughs.

The rope 1 could also be made of a plastic material (for example polyamide resins) which is resistant and flexible and also the helix 2 could be made of a number of resistant and flexible materials.

Figure 3:
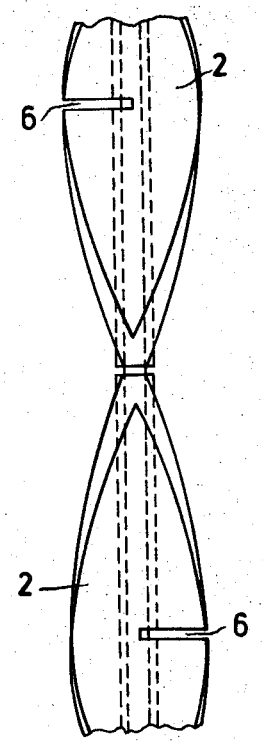
FIG. 3 shows an alternative embodiment of the conveying member.

The helix can be a single-start helix as well as a multistart helix. The helices could be also two with contrary directions, and thus they cross at each pitch height, as fragmentarily shown in FIG. 3.

The helix can be made as a single unit or it may also made of several sections. A better understanding of the nature and of the relationship therebetween, the unity of the core and helical body may be gained by considering a device for forming the present invention. The machine shown in FIGS. 4 to 6 comprises a feeding head 10, having a cylindrical bore 11 in the interior of which a rope 12, preferably a steel rope, is caused to advance by a feeding roller 13 driven by an electric motor 14.

The rope 12 is taken from a properly supported reel 15. Perpendicularly to the bore 11 a feed of plastic material is provided, preferably a polyamide resin, in the molten state. To this end a hopper 16 is catered for, which feeds a duct 17 housing a screw 18 for feeding the molten stock to an inlet fitting 19. All around the section which contains the fitting 19 a heating resistor 20 is provided, which is intended to insure that the plastic material in the molten condition may not be deprived of its fluid characteristics which are necessary for carrying out the extrusion step. The rope 12 and the thermoplastic material which is melted through the cylindrical bore 11 are simultaneously fed to a cylindrical extruder 21 which is mounted for rotation on ball bearings 22 and whose outer surface carries an integral gear 23: this latter, by the intermediary of the chain 24, is driven by an electric motor 25. The extruder 21 is kept pressed against the feeding head 10 by a flange 26 with an appropriate sealing gasket, said flange cooperating with an extension of the head 10 through the bolts 27.

The extruder 21 has, at the level of the outlet of the head 10, a funnel-shaped inlet duct 30 through which the rope 12 is passed and which is filled with molten thermoplastic material. At its inner end, the duct 30 is terminated by an axial cylindrical bore 29 matched and aligned with the bore 11 of the head 10. Said bore 29 is in communication with a groove or channel 31 whose height is arranged radially with respect to the extruder 21 and which is longitudinally aligned with the bore 29.

In the end portion of the extruder 21 said groove 31 has a helical trend as shown in the fragmentary cross-sectional view of the extruder in FIG. 6. At the end of the extruder 21 the elongate helical body 32 thus obtained is passed through an appropriate cooling device 33. The operation of the device described is as follows: the cavity 30 is filled with molten thermoplastic material whose temperature is controlled by a heating resistor 35, and which then fills the channel 31 and forms a sheath in the bore 29 surrounding the rope 12 and encapsulating it. Then the thermoplastic material is passed through the helical portion of the channel 31. Said advance movement is due to the fact that the extruder 21 is rotated, whereas the rope 12 is thrust forward by the roller 13 and the molten thermoplastic material is fed forward by the feeding screw 18.

To avoid that at the outlet of the extruder 21 the helical portion of the body 32 may be deformed or become warped, a cooler 33 is provided.

The invention has been described in connection with a preferred embodiment, it being none-the-less understood that mechanically equivalent modifications may be made therein without departing from the scope of said invention.

We claim:

1. A member for conveying nonadherent, powdered or granular materials, more particularly food for chickens or other animals, comprising as a core a ropelike material having a certain resistance and flexibility and a body portion of thermoplastic material with an integrally formed web in the form of a helix, said body also having resistance and flexibility and being integrally molded with said ropelike core and coaxial therewith wherein said member is made as a single continuous piece, and wherein said body portion is formed with two or more helical webs.

2. The member according to claim 1, wherein said member is made as a sequence of sections molded about said core.

3. The member according to claim 1, wherein each of said body portion sections is formed with two helical webs, one opposing the other.

4. The member according to claim 2, wherein each of said webs has a plurality of notches (adapted to impart an improved pliability to said web).

5. The member according to claim 1, wherein said web has a plurality of notches adapted (to impart improved pliability).

6. The member according to claim 1, wherein each of said webs has a plurality of notches (adapted to impart as improved pliability to said web).